United States Patent
Sihn

(10) Patent No.: US 8,463,997 B2
(45) Date of Patent: Jun. 11, 2013

(54) APPARATUS AND METHOD OF CACHING FRAME

(75) Inventor: Kue-Hwan Sihn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 776 days.

(21) Appl. No.: 12/193,091

(22) Filed: Aug. 18, 2008

(65) Prior Publication Data

US 2009/0049246 A1 Feb. 19, 2009

Related U.S. Application Data

(60) Provisional application No. 60/956,194, filed on Aug. 16, 2007.

(30) Foreign Application Priority Data

Dec. 12, 2007 (KR) .......................... 10-2007-0129116

(51) Int. Cl.
*G06F 12/08* (2006.01)

(52) U.S. Cl.
USPC ............................ 711/118; 711/137; 345/565

(58) Field of Classification Search
USPC ................................................. 345/530, 566
See application file for complete search history.

(56) References Cited

U.S. PATENT DOCUMENTS

| | | | | |
|---|---|---|---|---|
| 6,009,236 A * | 12/1999 | Mishima et al. | ............... | 386/329 |
| 6,078,988 A * | 6/2000 | Komori | ......................... | 711/112 |
| 6,262,748 B1 * | 7/2001 | Deering et al. | ................ | 345/519 |
| 7,697,816 B2 * | 4/2010 | Takada et al. | ................. | 386/241 |
| 2005/0001848 A1* | 1/2005 | Colavin | ....................... | 345/566 |
| 2005/0268022 A1* | 12/2005 | Pelley | ................................ | 711/5 |
| 2007/0070083 A1* | 3/2007 | Fouladi et al. | ................ | 345/604 |
| 2007/0201554 A1* | 8/2007 | Sihn | .......................... | 375/240.12 |

OTHER PUBLICATIONS

Jike Chong; Satish, N.; Catanzaro, B.; Ravindran, K.; Keutzer, K.; , "Efficient Parallelization of H.264 Decoding with Macro Block Level Scheduling," Multimedia and Expo, 2007 IEEE International Conference on , vol., no., pp. 1874-1877, Jul. 2-5, 2007.*
Jike Chong; Satish, N.; Catanzaro, B.; Ravindran, K.; Keutzer, K.;, "Efficient Parallelization of H.264 Decoding with Macro Block Level Scheduling," Multimedia and Expo, 2007 IEEE International Conference on, vol., no., pp. 1874-1877, Jul. 2-5, 2007.*

* cited by examiner

*Primary Examiner* — James A Thompson
*Assistant Examiner* — Fikru Gennene
(74) *Attorney, Agent, or Firm* — Sughrue Mion, PLLC

(57) ABSTRACT

An apparatus and method of caching a frame is provided. The method of caching a frame includes receiving information on a frame to be cached from a main storage unit, setting an initial value of a specified mode using the received information, and caching the frame from the main storage unit using the specified mode.

28 Claims, 13 Drawing Sheets

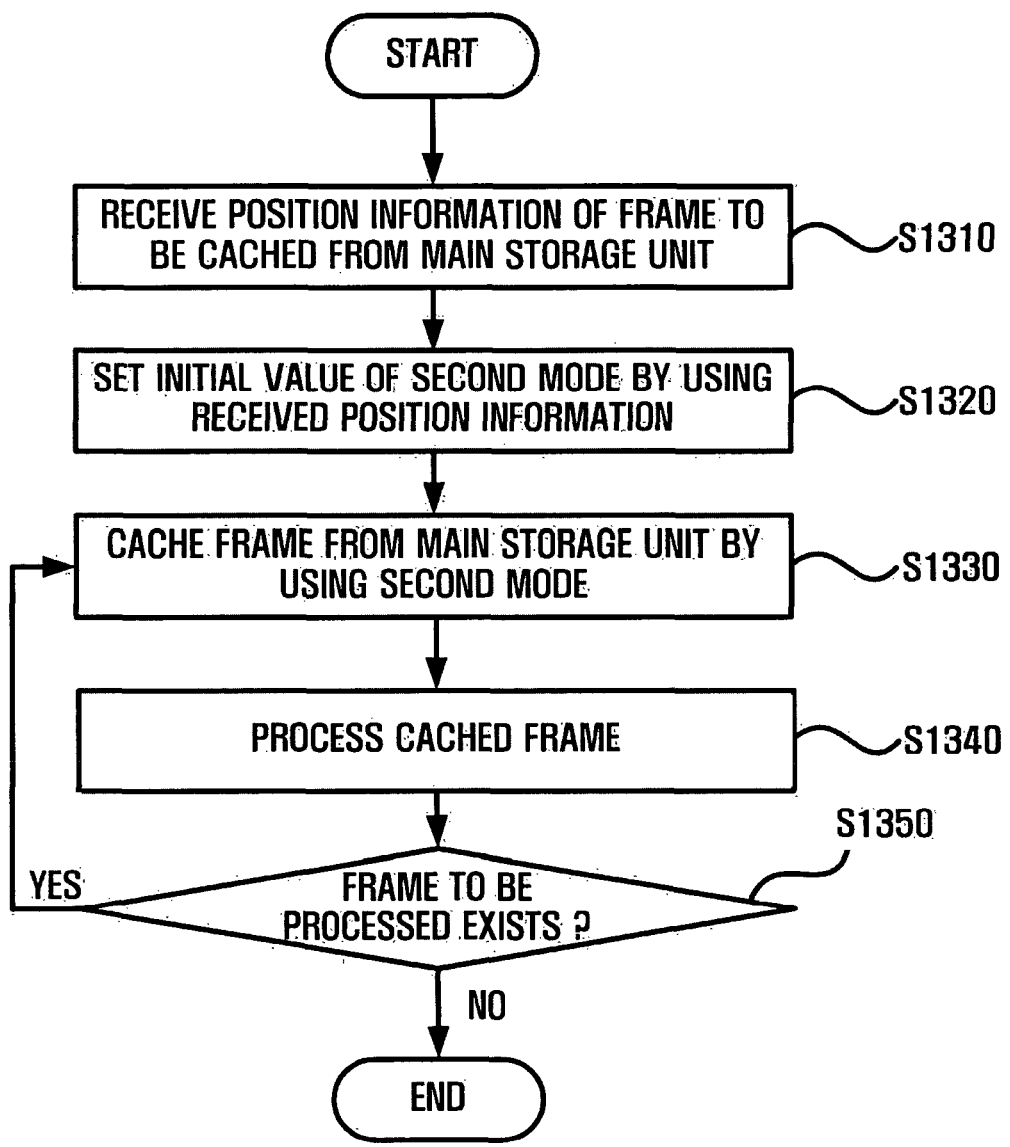

APPARATUS AND METHOD OF CACHING FRAME

CROSS-REFERENCE TO RELATED APPLICATION

This application is based on and claims priority from U.S. Provisional Application No. 60/956,194 filed on Aug. 16, 2007 in the United States Patent and Trademark Office and Korean Patent Application No. 10-2007-0129116 filed on Dec. 12, 2007 in the Korean Intellectual Property Office, the disclosures of which are incorporated herein in their entirety by reference.

FIELD OF THE INVENTION

Apparatuses and methods consistent with the present invention relate to caching a frame, and more particularly to caching a frame, which can receive information on a frame to be cached, set an initial value of a specified mode using the received information, and cache the frame using the specified mode.

SUMMARY OF THE INVENTION

A multiprocessor SoC (Single on Chip) having a plurality of heterogeneous cores, such as Cell BE (SONY, TOSHIBA, IBM), has been spread, and there has been an increasing demand for a method of efficiently processing the plurality of cores. The present invention relates to an apparatus and method for efficient processing of the plurality of cores.

FIG. 1 is a schematic view illustrating a conventional multiprocessor SoC. Referring to FIG. 1, a multiprocessor SoC (MPSoC) having a plurality of Single Instruction, Multiple Data (SIMD) accelerators, such as SPE (Synergistic Processing Elements) (Cell BE) 110_1 to 110_8, is advantageous in processing multimedia data, such as video or image data. This MPSoC includes a plurality of SPE 110_1 to 110_8. However, since the SPE 110_1 to 110_8 are not included in a hierarchy of a main memory 130, but are included in independent local stores 120_1 to 120_8, it is required to use a DMA (Direct Memory Access) 140 in the case of accessing the main memory 130. Also, the SPE 110_1 to 110_8 are provided with the local stores to 120_8 having a small capacity, for example, 256 KB, respectively, and store and process both codes and data by using the local stores 120_1 to 120_8, thereby causing problems in reading and storing large-capacity data at a time.

FIG. 2 is a view illustrating an image frame stored in the multiprocessor of FIG. 1. Referring to FIG. 2, an image frame 210 in the main memory 130 includes a plurality of blocks 240_1 to 240__n. It is prescribed that an uppermost start point of the blocks 240_1 to 240__n is a low address 220, and a lowermost last point of the blocks 240_1 to 240__n is a high address 230. Also, a space between the first block and the last block of one image frame composed of the plurality of blocks 240_1 to 240__n, which are apart from each other as long as the space occupied by the plurality of blocks 240_1 to 240__n in a horizontal axis, is prescribed as a frame stride. Specifically, each of the blocks 240_1 to 240__n, in the same manner as the image frame 210, has a block start point 250 and a block width indicating a block space in a horizontal axis, and also has a space as long as the frame stride in a vertical axis. In the main memory 130, two-dimensional data, such as an image or a video frame, is stored in the unit of a block in a raster scan direction. In the case of processing such data by using a single processor, there is no problem in accessing the data. However, in order for the SPE 110_1 to 110_8 to access the data, it is required to read or write the data by one pixel line or several pixel lines through the DMA. Particularly, in the case of processing the data in the unit of a block having a specified size in width and length, the respective block lines are not successive. In other words, start points of the respective lines in the block 240_1 to 240__n have a difference in space as long as the frame stride as shown in FIG. 2, and thus, there is a problem in bringing the blocks 240_1 to 240__n through an access of the DMA 140 only once.

FIG. 3 is a view explaining a DMA process in a main memory if an image frame of FIG. 2 is convoluted. Referring to FIG. 3, in the case of the image convolution or deblocking filter, the DMA process is performed by blocks, but the blocks may have overlapping parts. The first block 310 and the second block 320 have an overlapping part in a horizontal direction, and the first block 310 and the third block 330 have an overlapping part in a vertical direction. Accordingly, in the case of processing the DMA by blocks, the respective blocks are read, but a separate process should be performed with respect to the overlapping parts. For this, a method of reading in advance a part of blocks in a horizontal direction may be used, but there is a problem that an application program code and a complicated DMA code are mixed with each other.

FIG. 4 is a view explaining a DMA process in a main memory if the image frame of FIG. 2 is motion-compensated. Referring to FIG. 4, in the case of the motion compensation of an H.264 codec, the size of blocks to be processed is not uniform, the blocks being referred to are not aligned, and randomness is included in the position of a block to be read in accordance with the size of a motion vector. Also, in performing the motion compensation of the H.264 codec, it is possible to simultaneously refer to a plurality of reference frames. Specifically, as illustrated in FIG. 4, a motion compensated frame 440 may refer to block 2 existing in the first frame 410 and the second frame 420. Accordingly, although there exists somewhat spatial locality in the neighborhood of the block to be referred to, a problem may occur in performing double buffering and so on if it is not accurately predicted what block is to be accessed later.

Accordingly, the present invention has been made to solve the above-mentioned problems occurring in the related art, and an aspect of the present invention is to provide an apparatus and method of caching a frame which can perform caching and prefetching of a large-capacity two-dimensional (2D) image frame stored in a main storage unit on a multiprocessor SoC having a heterogeneous configuration composed of a plurality of processors.

Another aspect of the present invention is to provide an apparatus and method of caching a frame which can provide an interface that can make programming possible even without considering a combination of complicated DMA transfer commands, memory alignment, double buffering, and the like.

Still another aspect of the present invention is to provide an apparatus and method of caching a frame which can perform two-dimensional caching having multiple associativity and spatially predictive prefetching.

Additional aspects and features of the invention will be set forth in part in the description which follows and in part will become apparent to those having ordinary skill in the art upon examination of the following or may be learned from practice of the invention.

In order to accomplish these aspects, there is provided a method of caching a frame, according to embodiments of the present invention, which includes receiving information on a frame to be cached from a main storage unit; setting an initial value of a specified mode using the received information; and caching the frame from the main storage unit using the specified mode.

In another aspect of the present invention, there is provided an apparatus for caching a frame, which includes a storage module receiving information on a frame to be cached from a main storage unit; and a processing module setting an initial value of a specified mode using the received information, and caching the frame from the main storage unit using the specified mode.

BRIEF DESCRIPTION OF THE DRAWINGS

The above and other aspects and features of the present invention will be more apparent from the following detailed description taken in conjunction with the accompanying drawings, in which:

FIG. 13 is a view illustrating a method of processing an image frame using the second mode according to an embodiment of the present invention.

DETAILED DESCRIPTION OF THE EXEMPLARY EMBODIMENTS

Figure 1:
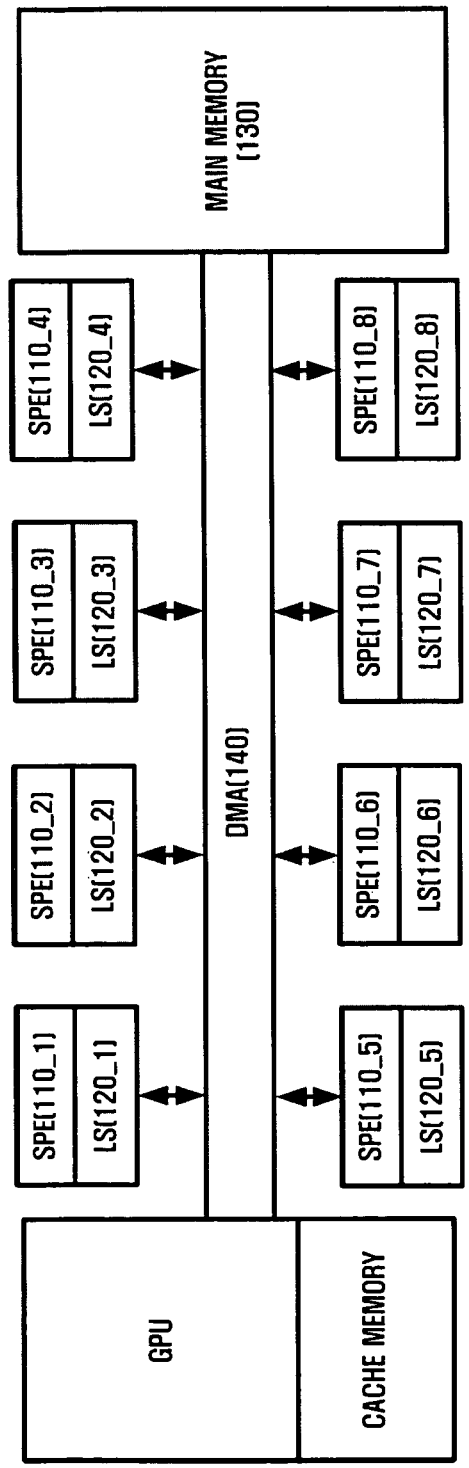
FIG. 1 is a schematic view illustrating a conventional multiprocessor SoC.
Figure 2:
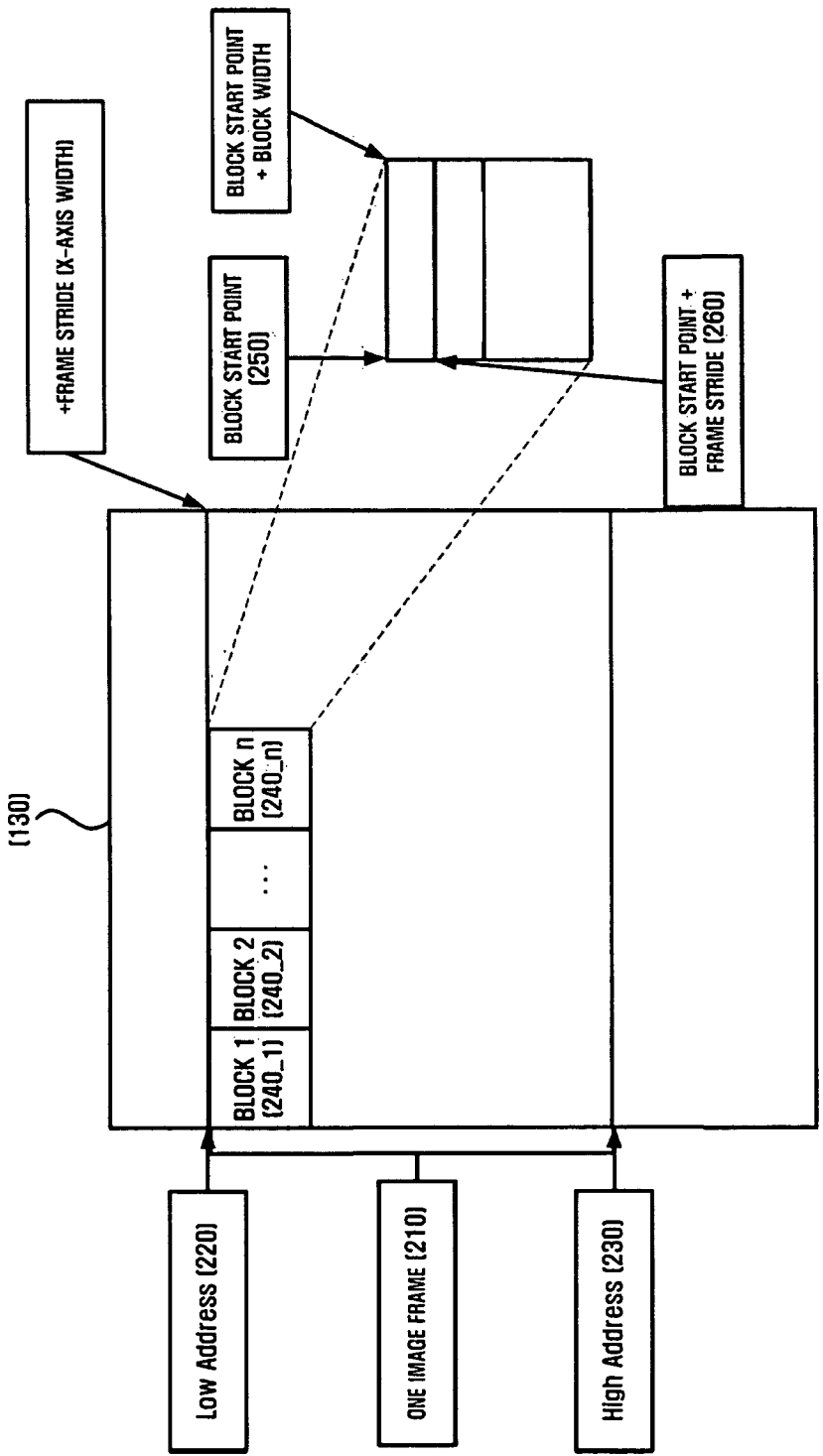
FIG. 2 is a view illustrating an image frame stored in the multiprocessor of FIG. 1.
Figure 3:
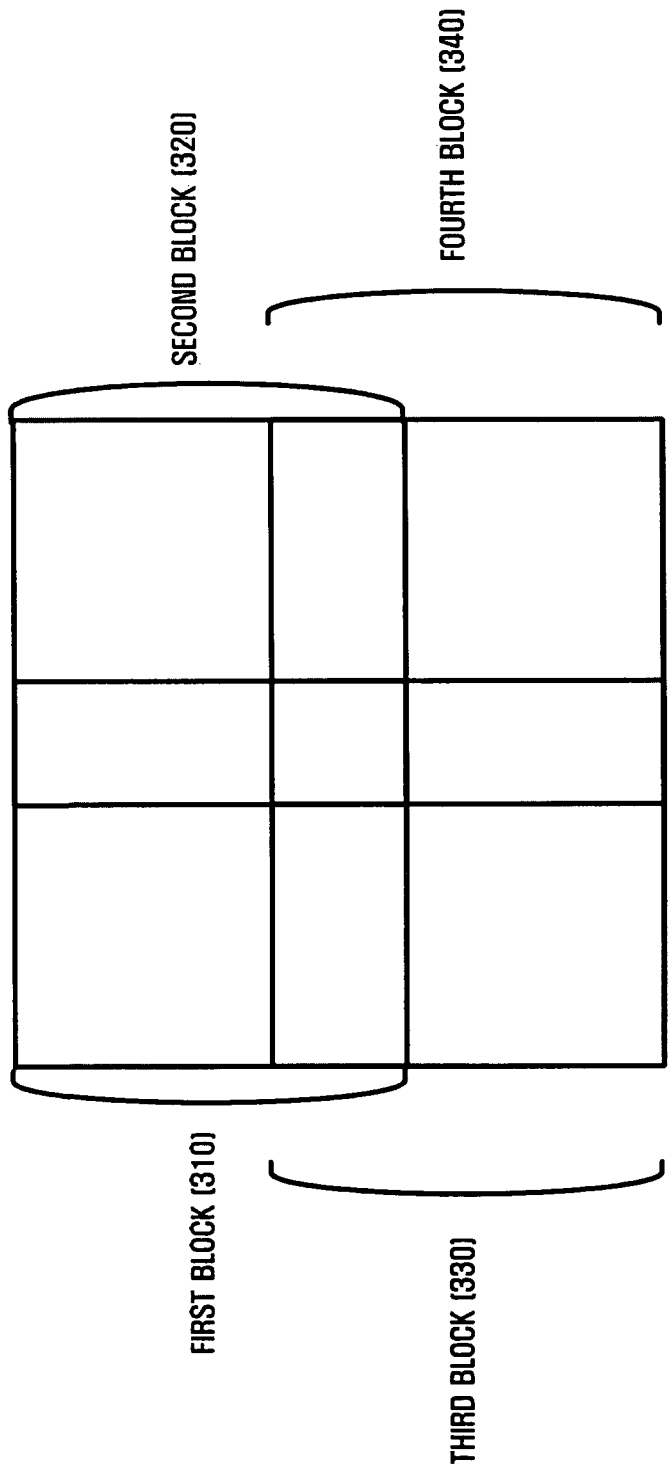
FIG. 3 is a view explaining a method of processing a DMA in a main storage unit 540 if an image frame of FIG. 2 is convoluted.

Hereinafter, exemplary embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

The term □module□, as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 5:
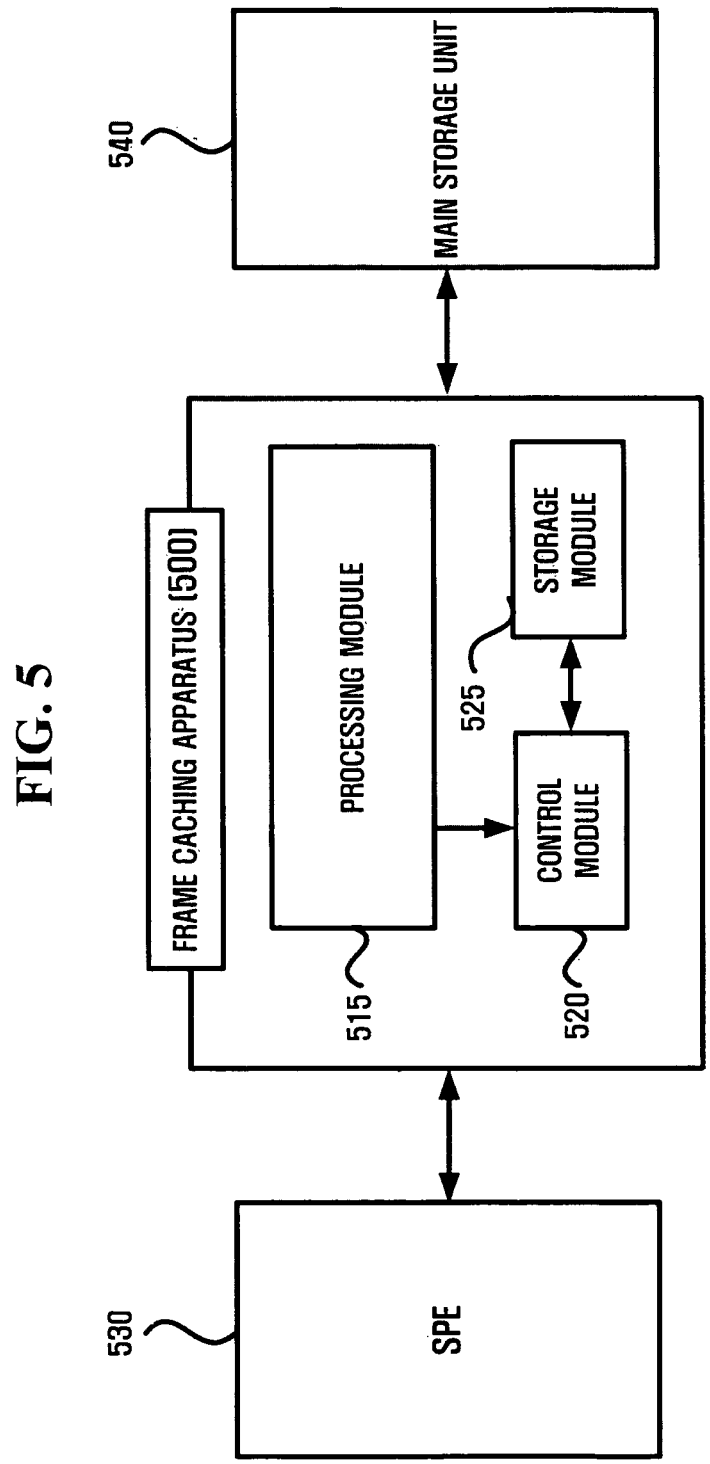
FIG. 5 is a schematic view illustrating the configuration of a frame caching apparatus according to an embodiment of the present invention.

FIG. 5 is a schematic view illustrating the configuration of a frame caching apparatus according to an embodiment of the present invention.

Referring to FIG. 5, the frame caching apparatus 500 includes a processing module 515, a control module 520, and a storage module 525. The frame caching apparatus 500 is connected to a main storage unit 540 storing SPE (Synergistic Processing Elements) 530 for processing data, image data, and the like. In an alternative exemplary embodiment, the main storage unit is included in the frame caching apparatus. The frame caching apparatus 500 receives data from the main storage unit 540, or transfers the data to the main storage unit 540, and uses DMA (Direct Memory Access) as described above. Constituent elements according to an embodiment of the present invention will now be described in detail.

First, the processing module 515 serves to process data transferred from the storage module 525 or the main storage unit 540. Here, the data may include image data, video data, and the like, and may also include frame caching as an example of a data processing method.

Specifically, the processing module 515 requests a specified function stored in the storage module 525 using the processing module 515 itself or the control module 520, and receives an address value including position information of the frame or information on frame geometry from the main storage unit 540 using the requested function. The information on the frame geometry may include information on blocks.

After receiving the address value including the position information of the frame or the information on the frame geometry from the main storage unit 540, the processing module 515 sets an interface for processing data of the main storage unit 540. The interface is expressed as a specified mode, and the specified mode includes at least one of a first mode and a second mode. The first mode and the second mode will be described later with reference to FIGS. 6 to 9. Using the set first mode and second mode, image data stored in the main storage unit 540 can be cached, and the detailed description thereof will made according to a detailed embodiment of the present invention. Also, in the first mode and the second mode, a predetermined region may be used, and the predetermined region corresponds to the blocks constituting the frame of the main storage unit 540. The blocks and the predetermined region will be described in more detail later.

As an example of the first mode, the processing module 515 can cache a frame including a plurality of blocks from the main storage unit 540 using the first mode. The processing module 515 requests an InitRegion function stored in the storage module 525, and the requested InitRegion function designates a frame geometry including a plurality of blocks stored in the main storage unit 540 and a frame stride. After the frame geometry and the frame stride are designated, the processing module 515 designates the geometry of the frame to be currently processed by requesting an InitWindow function stored in the storage module 525, and initializes the first mode.

After the first mode is initialized, the processing module 515 requests a MoveWindow function, and the requested function sets a region, which corresponds to the current block in the frame, to reflect the set region in the first mode. Accordingly, the processing module 515 forms a region having a reference value (i.e., reference value of the region corresponding to the reference value of the blocks) that corresponds to the blocks in the frame, and reflects the region in the first mode to cache the blocks. More detailed description thereof will be made later with reference to FIG. 8.

The processing module 515 requests an IterateWindow function, and the requested function sets a region, which corresponds to the current block in the frame, to reflect the set region in the first mode. Accordingly, the processing module 515 iteratively makes the blocks in the frame correspond to the region, and the region is reflected in the first mode, so that the blocks in the frame are iteratively read. In other words, the blocks in the frame are cached by the frame caching apparatus 500. Also, in order to iteratively cache the blocks in the frame, information on position relations between the blocks is received from the block information in the frame geometry information, and a difference in distance between the blocks, i.e. values of X-axis increment XInc and Y-axis increment YInc, is recognized using the received position information. Accordingly, the region corresponding to the blocks is iteratively set, and by using the first mode reflecting the region, the blocks are cached. More detailed description thereof will be made later with reference to FIG. 8.

In addition, as an example for the first mode, the processing module 515 may perform the prefetching and so on. The detailed description thereof will be made later with reference to FIG. 8.

As an example of the second mode, the processing module 515 can cache a frame including a plurality of blocks from the main storage unit 540 using the second mode. In the same manner as the first mode described above, the processing module 515 sets a region using the InitRegion function. After setting the region, the processing module 515 requests a SetRegionBase function stored in the storage module 525, and the requested SetRegionBase function reflects the current region, which corresponds to the block in the frame including a plurality of blocks stored in the main storage unit 540, in the second mode, sets a reference pointer of the region corresponding to a reference point of the block, and reflects the set region in the second mode.

As described above with reference to the first mode, the processing module 515 sets a region corresponding to a block in a frame by using MoveWindow function and IterateWndow function, and reflects the set region in the second mode to cache the block.

The processing module 515 sets a region corresponding to a block in a frame including a plurality of blocks, and if the set region is reflected in the second mode, the processing module 515 or SPE 530 processes the region reflected in the second mode. After the region is processed, the processing module 515 updates the main storage unit 540. For this, the processing module 515 requests UpdateRegion function, and the requested UpdateRegion function updates the main storage unit 540. Particularly, if the processing module 515 sets the region corresponding to the block to a region larger than the block, only the block region in the set region can be processed. In this case, the processing module 515 sets ☐Write Mask☐ with respect to the unprocessed region in the cached region to write back or nullify the unprocessed region in the region cached to the main storage unit 540. For this, the processing module 515 requests a FlushRegion function, and the requested FlushRegion function writes back or nullifies the unprocessed region in the cached region. The detailed description thereof will be made later with reference to FIG. 11.

As another example of the second mode, the processing module 515 may perform the prefetching and so on. The detailed description thereof will be made later with reference to FIG. 10.

The control module 520 serves to manage and control all constituent elements in the frame caching apparatus 500. Also, the control module 520 requests functions required for the processing module 515 to perform specified works to the storage module 525, and provides the requested functions to the processing module 515.

The storage module 525 serves to bring out a part of two-dimensional (2D) image frames in the frame caching apparatus 500 through the DMA, using the first mode and the second mode, or to store a library including a plurality of functions for writing back to the main storage unit 540 and data including image frames and so on. Here, the library and the data may be separately stored, and the storage module may include a first storage module for storing the library and a second storage module for storing the data.

First, functions supported in the library include functions of InitRegion, InitWindow, MoveWindow, IterateWindow, SetRegionBase, UpdateRegion, FlushRegion, and the like, and the roles of the respective functions are as described above.

The data stored in the storage module 525 may include image frames or video frames. Also, the storage module may include a plurality of slots, and store the data using the plurality of slots.

The SPE 530 is a kind of processor that is connected to the main storage unit 540 through the DMA to read and process the data stored in the main storage unit 540. The SPE 530 may be operated independently of the main processor. Also, the SPE may temporarily store the data read from the main storage unit 540 in the storage module 525, and process the cached data through the processing module 515.

The main storage unit 540 is a large-capacity memory, and serves to store data. The main storage unit 540 also serves to transfer or receive the stored data in accordance with the request of the SPE 530 or the processing module 515.

Figure 6:
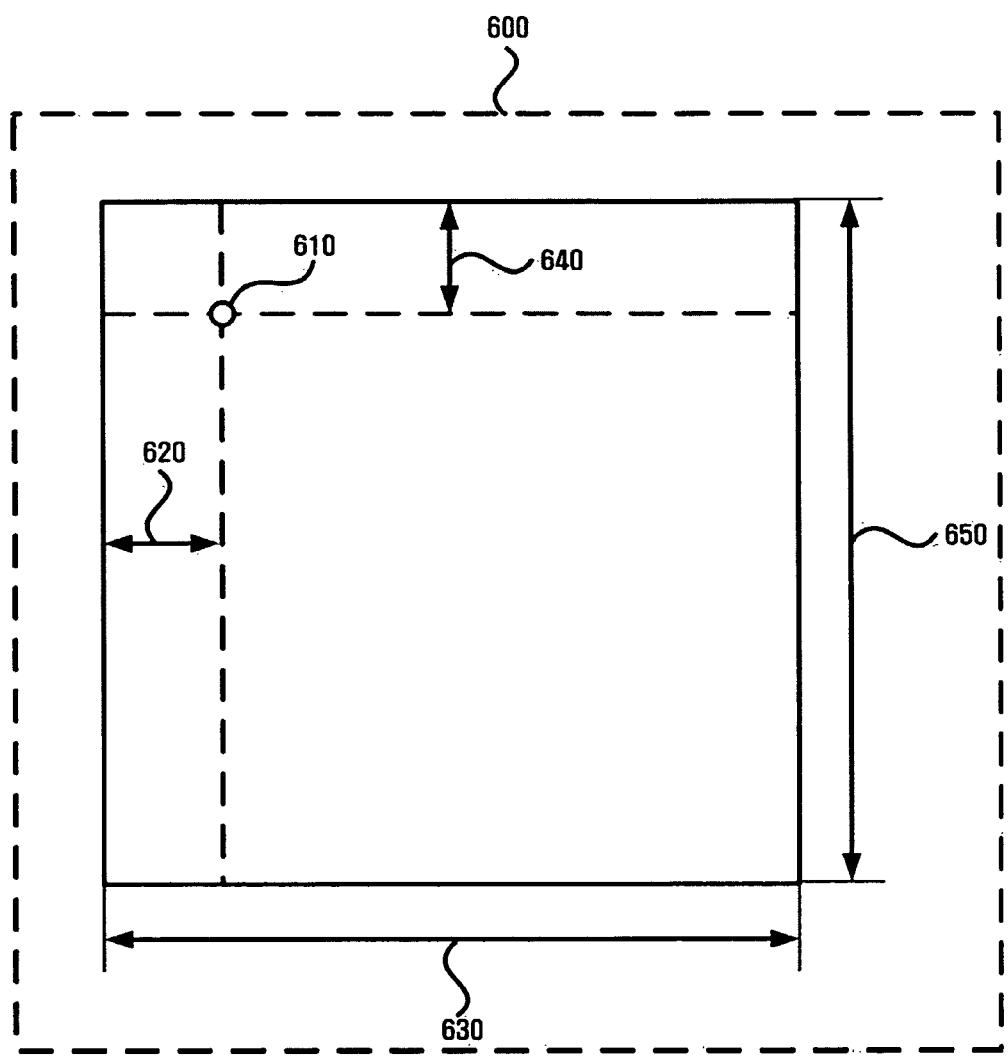
FIG. 6 is a view explaining a general mode in which the frame caching apparatus processes a frame according to an embodiment of the present invention.

FIG. 6 is a view illustrating a region in which the frame caching apparatus processes an image frame according to an embodiment of the present invention.

Referring to FIG. 6, the region as described above with reference to FIG. 5 will be described in more detail. The processing module 515, in order to access a frame stored in the main storage unit 540, prescribes an application program interface (API) set having a region structure based on a block that is a unit of processing.

Here, the block is a unit constituting the frame, and has a specified size in X-axis and Y-axis directions on the basis of a specified reference point. The X-axis direction is a horizontal axis direction, and the Y-axis direction is a direction perpendicular to the X-axis direction on the basis of the reference point, so that the X-axis and the Y axis form a plane. The shape of the block is not limited thereto, and may be extended to a range where those of ordinary skill in the art can modify it. Also, the blocks in the frame may overlap each other, and thus an overlapping part may exist between the blocks.

When the frame caching apparatus 500 caches a frame from the main storage unit 540, it cannot directly read the frame in the main storage unit 540 due to a small storage space of the storage module, and thus caches the frame in the unit of a block. However, in order to easily process the cached block, the frame caching apparatus 500 provides an interface, such as the first mode or the second mode, as described above, and prescribes the region that is the basic unit of the interface.

The region forms a 2D plane composed of an X-axis and a Y-axis on the basis of the referent point 610. Also, as illustrated in FIG. 6, the 2D plane may be extended in a negative direction of an X-axis and in a negative direction of a Y-axis on the basis of the reference point. Also, the 2D plane may be prescribed as coordinates along the X-axis and the Y-axis on the basis of the reference point. Accordingly, as illustrated in FIG. 6, a region is prescribed, which includes negative coordinates 620 of the X-axis, negative coordinates 640 of the Y-axis, the maximum length 630 of the X-axis, and the maximum length 650 of the Y-axis.

The main storage unit 540 stores the data in the form of a frame, and the frame is stored in the unit of a block as described above. If an overlapping part exists between the neighboring blocks in the frame, it is required to perform a negative indexing, and for this, the region forms a negative region in X-axis and Y-axis directions. Accordingly, by performing the negative indexing by using the region, the data can be read from the main storage unit 540 more efficiently.

Figure 7:
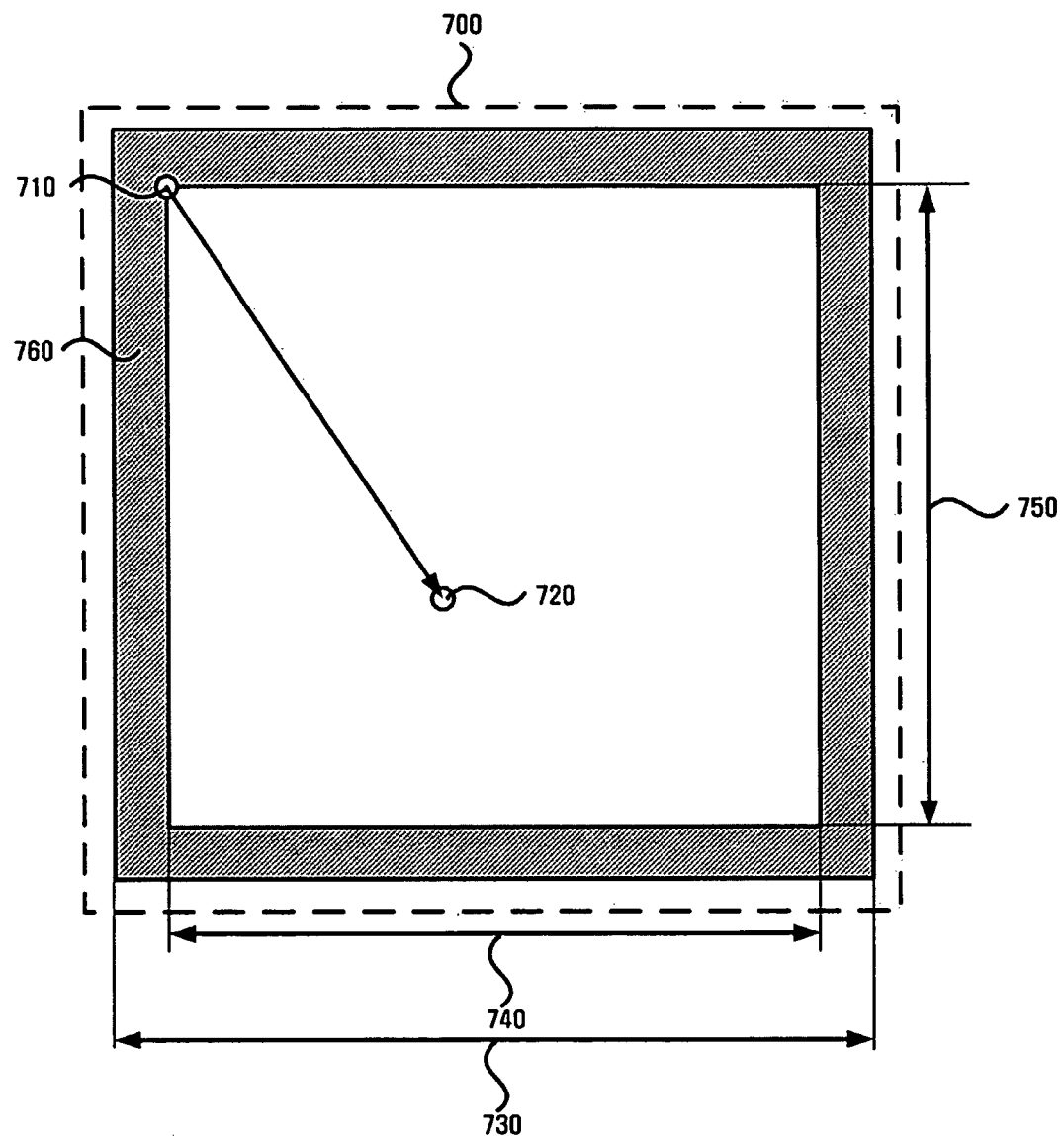
FIG. 7 is a view explaining the setting of a first mode in which the frame caching apparatus processes the frame.

As an example of a region, the first mode will be described with reference to FIG. 7. FIG. 7 is a view explaining the setting of a first mode in which the frame caching apparatus 500 processes the frame.

Referring to FIG. 7, if a reference point 710 is set as illustrated in FIG. 6, the first mode 700 determines, on the basis of the reference point 710, the maximum distance of the X-axis, i.e. maxX 730, the maximum distance of the Y-axis, i.e. maxY 750, and a stride 740 between successive array elements in the main storage unit 540. Also, the first mode may include all the features of the region as illustrated in FIG. 6.

Figure 4:
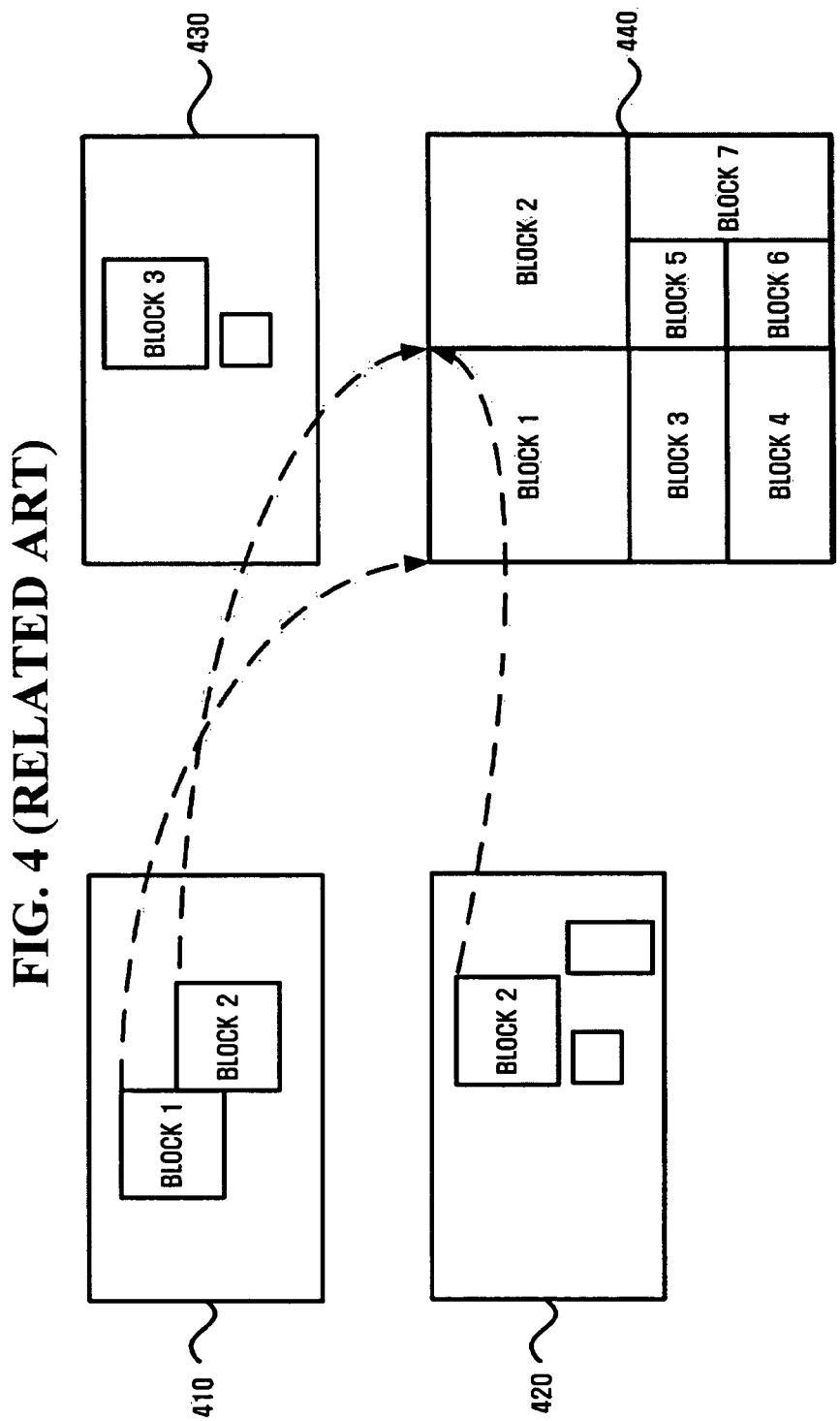
FIG. 4 is a view explaining a method of processing a DMA in a main storage unit 540 if an image frame of FIG. 2 is motion-compensated.

Also, as described above with reference to FIG. 4, in order to start the first mode 700, it is required to set the window geometry by requesting the InitWindow function. As the value of the remote stride 740 of the data stored in the main storage unit 540, the value known when the window geometry is designated is used, and the values of maxX 740 and maxY 750 are designated in consideration of the form of the frame. Particularly, if a border 760 exists, the shape of the border 760 is provided to the processing module 510 by adjusting the reference point 710 and the maximum geometry distances maxX 740 and maxY 750.

If the first mode 700 is initialized, the blocks are cached by movement or iteration of the region.

In the case of moving the region, new coordinates are generated as the reference point 720 by considering the position of the reference point 710 to be (0, 0) and calculating relative coordinates to the reference point 710. By using the moved region, the corresponding block is cached.

The region iteration means processing of blocks designated in the frame geometry in the main storage unit 540 through successive movement of the region. The detailed description thereof will be made with reference to FIG. 8.

Figure 8:
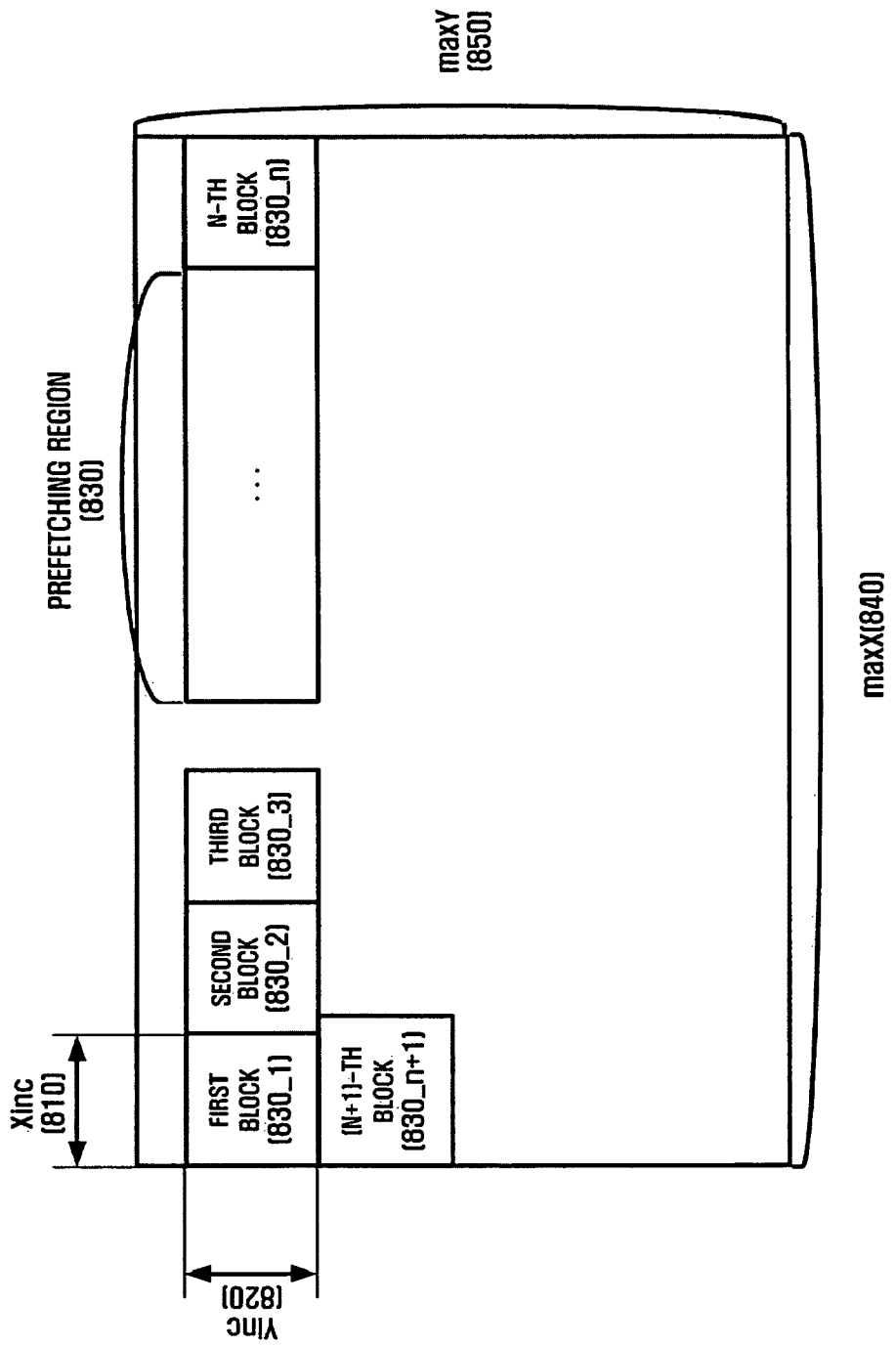
FIG. 8 is a view explaining a prefetching method in the first mode of FIG. 7 according to an embodiment of the present invention.

FIG. 8 is a view explaining a method of iterating the region in the first mode of FIG. 7.

Referring to FIG. 8, although the method of FIG. 8 may include all the contents as described above with reference to FIG. 7, only the feature of the present invention will be described. By successively moving the region of the frame in the main storage unit 540, the blocks designated in the frame geometry are successively processed from beginning to end.

Also, by designating values of xInc 810 and yInc 820, which are shorter than the width and length of the region, respectively, the effect of overlapping regions can be obtained.

In the case where the blocks are prescribed to overlap each other, it is required that the latest value of the updated region is always shown to the processing module 515 when the cache region is moved, and the final updated value, which cannot be changed any further, is stored in the main storage unit 540. Accordingly, in the case where the cache region is moved, the overlapping part is overwritten in a front part of the region read at the following cache, and thus the correctness can be secured. In addition, in performing the iterative process, the position movement of the region can be easily predicted, and good effects can be obtained even with a small-sized double buffer.

As illustrated in FIG. 8, if it is assumed that blocks 1, 2, . . . , and n exist in the current cached region, a region (i.e. a prefetching region) 830 including blocks to be subsequently accessed are prefetched, and thus it is possible to directly process the corresponding blocks without additional DMA delay when the blocks are subsequently accessed.

As an example of the region, the second mode will be described with reference to FIG. 9.

Figure 9:
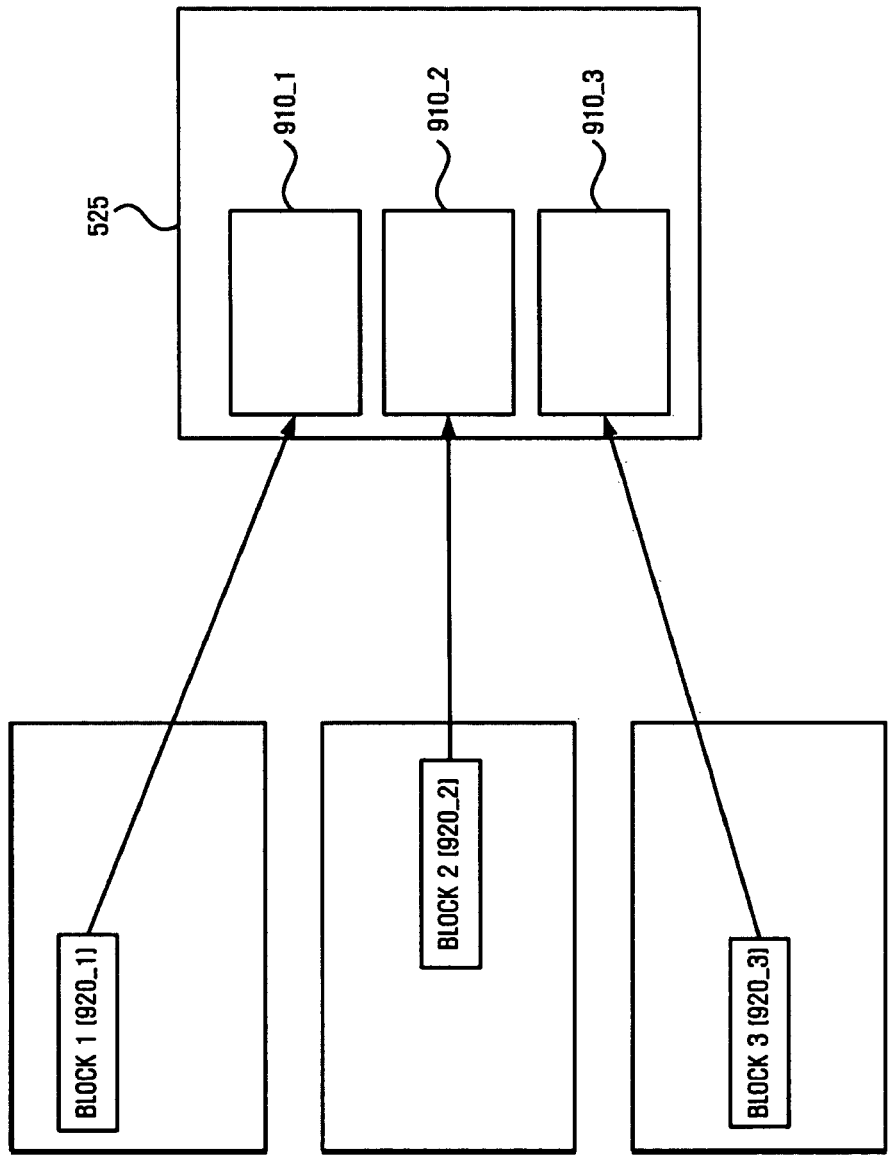
FIG. 9 is a view explaining the setting of a free mode in which the frame caching apparatus processes an image frame.

FIG. 9 is a view explaining the setting of the second mode in which the frame caching apparatus processes an image frame.

Referring to FIG. 9, unlike the first mode, the boundary of the frame is not designated, and thus any position designated by the main storage unit 540 can be read. Also, since the regular movement of the region is not assumed, unlike the first mode, only the reference pointer of the region is designated.

In the second mode, tetragonal blocks 920_1 to 920_3, of which the frame geometry is not designated, are read from the main storage unit 540 by using the interface of SetRegionBase.

Mainly in the case of the motion compensation, as illustrated in FIG. 9, several slots 910_1 to 910_3 are prepared in the storage module 525. If a certain block among them is designated, adjacent regions are read from the main storage unit 540 at a time, and the read regions are reflected in the region and then stored in the slots.

In the case of the motion compensation, there exists a spatial locality in adjacent regions, and thus it is intended to make hits occur greatly in the region once cached by using the width, length, and cache factor (which is larger than the X-axis and Y-axis sizes). However, since the storage module 525 is limited and the DMA delay occurs, it is impossible to read too large region at a time, and thus the cache size is variably determined within a range in which the local stride is not changed. That is, by observing the access position in the cached region before one slot 910_1 to 910_3 of the cache is replaced, more accurate cache factor can be determined.

Also, in the second mode, the associativity is provided. That is, a plurality of slots 910_1 to 910_3 is provided to cache different regions of the main storage unit 540. In the case of the motion compensation, most video codecs provide bidirectional prediction, and particularly, H.264 requires referring to a plurality of frames. Accordingly, by giving the associativity, it becomes possible to cache a plurality of frame regions even without replacement of one slot. The respective slots are replaced by using a replacement method such as a least recently used (LRU) method and so on.

Figure 10:
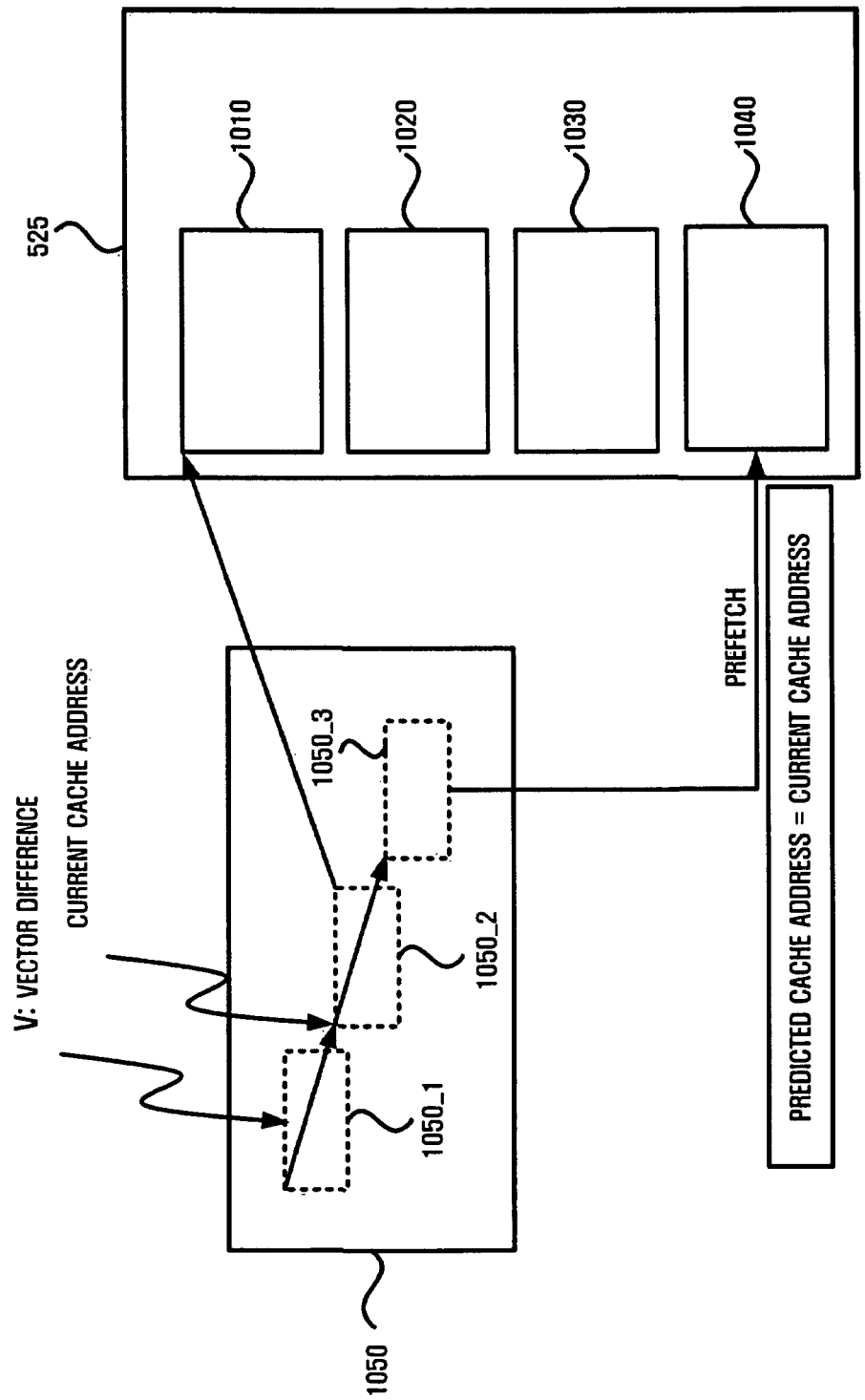
FIG. 10 is a view explaining a prefetching method in the second mode of FIG. 9 according to an embodiment of the present invention.

FIG. 10 is a view explaining the prefetching method in the second mode of FIG. 9 according to an embodiment of the present invention.

Referring to FIG. 10, a difference V between adjacent cache regions (e.g. a difference in position between a first region 1050_1 and a second region 1050_2 in FIG. 10) is tracked and stored. Specifically, a third region 1059_3, which is the next predicted region, is predicted as a region to be prefetched by using a value of □an address of the current cached region +V□, and is prefetched in the slot of an object to be replaced through an LRU method. Here, the slots 1010, 1020, 1030 and 1040 of the storage module 525 are shown.

Figure 11:
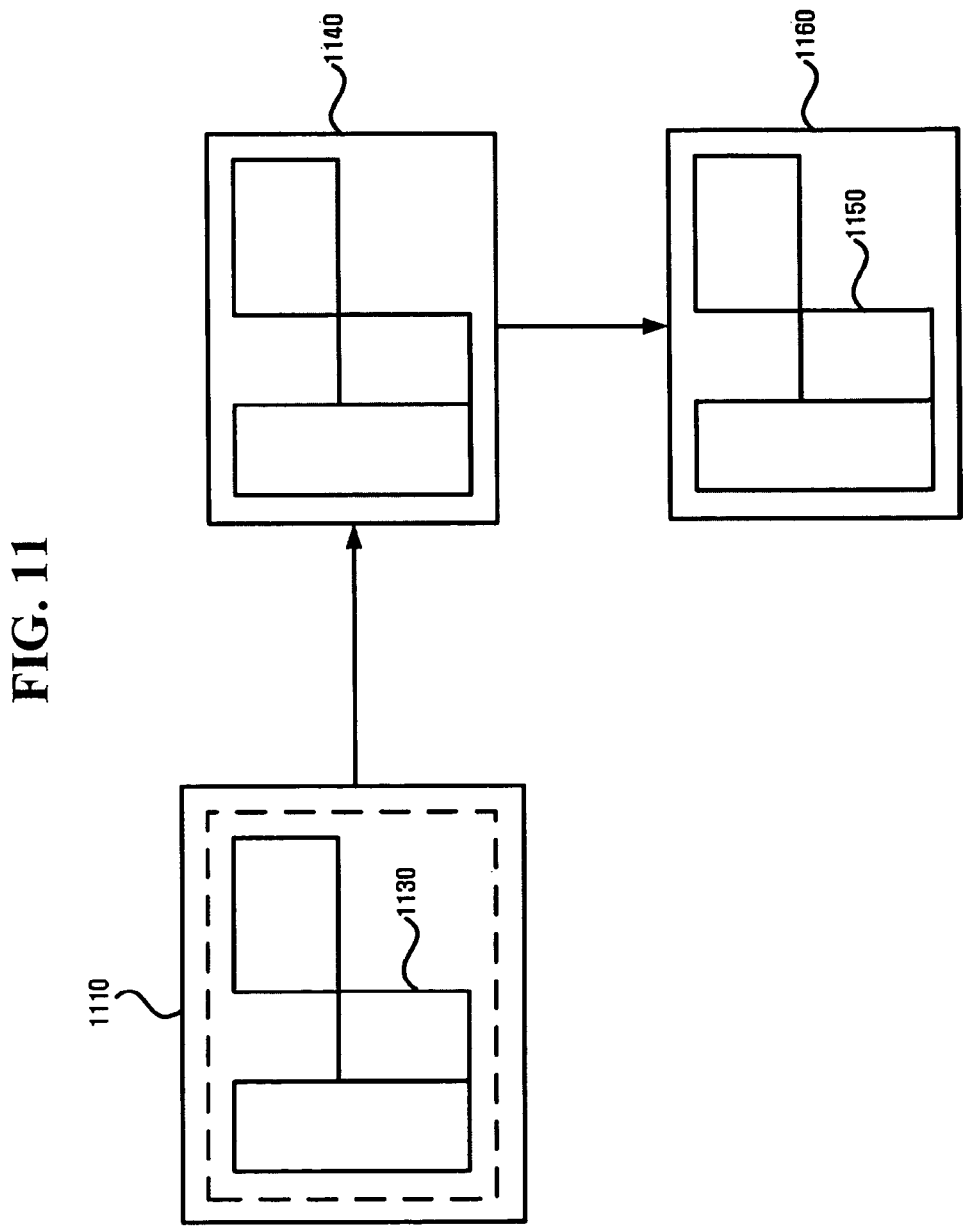
FIG. 11 is a view explaining a write mask method according to an embodiment of the present invention.

FIG. 11 is a view explaining a write mask method according to an embodiment of the present invention.

Referring to FIG. 11, if the size of a block in a frame 1110 stored in the main storage unit 540 is not uniform, the X-axis maximum value 630 and the Y-axis maximum value 650 of a region 600 are set to their maximum values, and the tetragonal region 600, which is prescribed to be larger than the block having the non-uniform size, is read when the block 1130 in the frame 110 is read by using the first mode or the second mode as described above. The read region 600 is stored in a slot 1140 provided in the storage module 525. In the case of writing the read block in the slot, the frame caching apparatus 500 may use a write mask in order not to injure the coherence on the boundary of blocks. Particularly, the write mask method is more efficient in the case where the size of the block is not uniform, such as in motion compensation (MC) of H.264.

The write mask method will now be described in more detail. If region 600, which is larger than the block 1130 in which actual data is stored, is read, and only a part of the read region 600 (i.e. the region 1150 corresponding to the block of the frame) is written in the main storage unit 540 to update the same, the data of the adjacent region (i.e. the region 1160 that is not designated as the block among the contents read as the region) may be destroyed. Accordingly, in order to solve this problem, a dirty bit 1160 is set in the non-written region by notifying the processing module 515 of the frame caching apparatus 500 of the size of the block actually written that is within the maximum size of the region 600 already declared. Accordingly, only information on the actually written region is transferred to the main storage unit 540, and the main storage 540 having received the information updates its contents by using the information. Accordingly, the data in the adjacent region of the main storage unit 540 is prevented from being destroyed. However, whether to apply the write mask method may be determined in accordance with the user setting.

Figure 12:
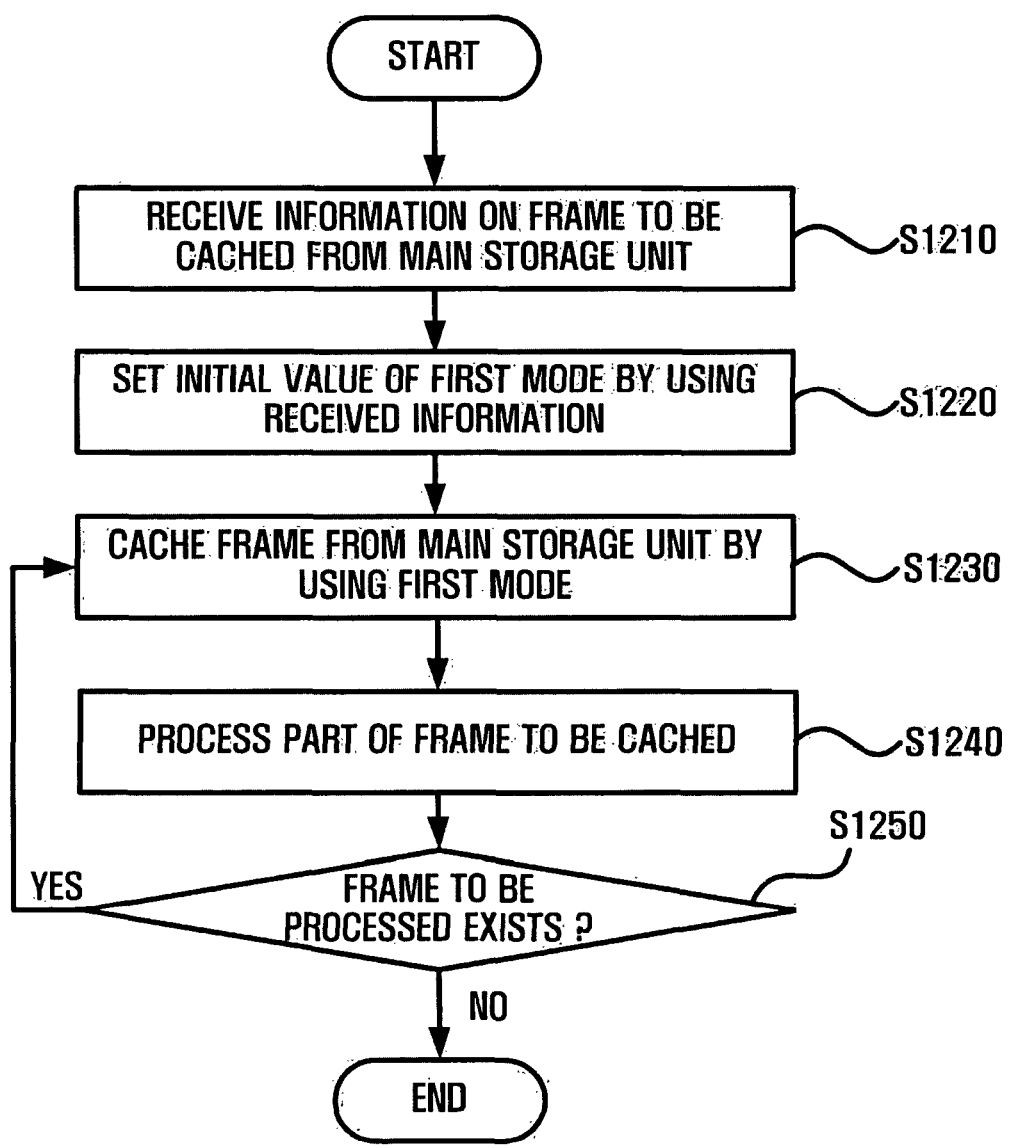
FIG. 12 is a view illustrating a method of processing an image frame using the first mode according to an embodiment of the present invention.

FIG. 12 is a view illustrating a method of processing an image frame using the first mode according to an embodiment of the present invention.

Referring to FIG. 12, information on the frame to be cached is received from the main storage unit 540 (S1210). As described above, the frame caching apparatus 500 describes the region in order to set the geometry of a frame stored in the main storage unit 540. A frame, which is composed of a plurality of blocks, may be read by making the prescribed region correspond to the block. By using the region as prescribed above, the geometry of the frame is set, and information on the geometrical arrangement of the frame to be cached is received from the main storage unit 540. Here, the information may include information required to set the initial value of the first mode, for example, an address value including position information of the frame and information on the frame geometry.

If the information on the frame is transferred, the initial value of the first modes is set by using the received information (S1220). The first mode sets the value corresponding to the reference value of the frame geometry as the reference value of the first mode. Also, the first mode sets a 2D region having the maximum value of X-axis and the maximum value of Y-axis by setting the region corresponding to a plurality of regions having been used to set the frame geometry, and this region may be set as relative coordinates to the frame geometry.

After the initial value of the first mode is set, the frame is cached from the main storage unit 540 by using the first mode (S1230). As described above, since the first mode is set corresponding to the frame geometry and the frame geometry is constructed in the unit of a block that corresponds to the region, the image processing apparatus 500 reads the block in the frame in the unit of a region. In accordance with the user setting, a plurality of blocks may be read as a region. In other words, the unit of caching may be one or more blocks.

As described above, the frame caching apparatus 500 may cache a part of the frame by moving the position of the frame geometry by using the first mode.

The frame caching apparatus 500 may prefetch the subsequently read block by reading the block in the frame by using the first mode.

After the frame is read from the main storage unit 540, the cached frame is processed (S1240). This process may include writing of a part of the cached frame. The processing module 515 may directly process a part of the cached frame, or transfer it to the SPE 530 so that the SPE can process it.

After the cached frame is processed, it is confirmed whether a frame to be processed exists in the main storage unit 540 (S1250).

If the frame to be processed exists in the main storage unit, the process moves to (S1230) to cache the frame, and then the above-described process is repeated until no frame to be processed exists in the main storage unit. Thereafter, if no frame to be processed exists in the main storage unit, the process is terminated.

FIG. 13 is a view illustrating a method of processing an image frame using the second mode according to an embodiment of the present invention.

The position information of the frame to be cached is received from the main storage unit 540 (S1310). The position information is read by reading a pointer indicating the address of the reference coordinates of the block in the frame to be cached.

After the position information is received, the initial value of the second mode is set by using the received position information (S1320). As described above, the initial value of the second mode, which prescribes the pointers indicating the prescribed region and addresses of the blocks in the frame read through the main storage unit, is set.

After the initial value of the second mode is set, the frame is cached from the main storage unit 540 by using the second mode (S1330).

As described above, by providing the associativity, a plurality of slots are included in the storage module 525, and a plurality of frame regions can be cached even without replacement of a slot.

As described above, by providing the prefetching, blocks corresponding to the prescribed regions are cached, and blocks to be cached later can be predictively prefetched.

In addition, by providing the write mask, the data in the adjacent region of the main storage unit 540 is prevented from being destroyed even if blocks having non-uniform sizes are cached in the frame. Also, the user can set whether to apply the write mask.

After the caching from the main storage unit 540, the cached frame is processed (S1340). As described above, the process may include writing of a part of the frame to be cached. The processing module 515 may directly process a part of the cached frame, or transfer it to the SPE 530 so that the SPE can process it.

It is confirmed whether a frame to be processed exists in the main storage unit 540 (S1350).

If the frame to be processed exists in the main storage unit, the process moves to (S1330) to cache the frame, and then the above-described process is repeated until no frame to be processed exists in the main storage unit. Thereafter, if no frame to be processed exists in the main storage unit, the process is terminated.

As described above, according to the frame caching apparatus and method of the present invention, the processing logic on the single core can be moved to the multiprocessor SoC as it is by implementing the multimedia application on the MPSoC, and thus the portability can be increased.

In addition, DMA issue overhead is reduced through the reduction of the frequency of the DMA, the duplicate DMA is avoided through the use of locality, and the data is loaded before the access through the prefetching, so that the performance of the multimedia application can be improved.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of caching a frame, comprising:
   receiving information on a frame to be cached from a main storage unit;
   determining if the received information comprises information on a frame geometry or an address value including position information of the frame;
   setting a mode from at least two modes based on the determining and setting an initial value for the set mode based on the determining and using the received information;
   and caching the frame from the main storage unit using the set mode wherein the at least two modes comprises a first mode in which a window with fixed block size is allocated for storing the frame using the received frame geometry and a second mode in which a window without a fixed block size is allocated for storing the frame using the received address value.

2. The method of claim 1, wherein the information on the frame geometry includes information on a block included in the frame geometry;
   wherein the block has a size in an X-axis direction and a Y-axis direction based on a reference point, the X-axis direction is a horizontal axis direction, the Y-axis direction is a direction perpendicular to the X-axis direction, and the X-axis and the Y-axis form a plane.

3. The method of claim 2, wherein the set mode includes a region;
   wherein the region corresponding to the block includes at least one of negative coordinates of the X-axis direction and negative coordinates of the Y-axis direction based on the reference point; and
   wherein the region forms a region between the X-axis and the Y-axis.

4. The method of claim 3,
   wherein the first mode includes a reference point corresponding to the reference point of the block that is included in information on the frame geometry, and a maximum value of X-axis direction coordinates and a maximum value of Y-axis direction coordinates.

5. The method of claim 4, wherein the caching comprises setting a reference point of the first mode to move a distance in at least one of an X-axis and a Y-axis directions in the frame geometry, and caching the frame from the main storage unit by using the first mode corresponding to the moved reference point.

6. The method of claim 4, wherein the caching comprises setting a reference point of the first mode to repeat movement for a distance in at least one of the X-axis and the Y-axis directions in the frame geometry to generate moved reference points, and caching the frame from the main storage unit by using the first mode corresponding to the respective moved reference points.

7. The method of claim 5, further comprising:
   determining a block to be cached in the frame geometry, considering the distance as a parameter; and
   caching the determined block from the main storage unit.

8. The method of claim 6, further comprising:
   determining a block to be cached in the frame geometry, considering the distance as a parameter; and
   caching the determined block from the main storage unit.

9. The method of claim 3,
   wherein the second mode sets a reference pointer corresponding to the reference point of the block that is included in information on the frame geometry, and includes a maximum value of X-axis direction coordinates and a maximum value of Y-axis direction coordinates, based on the reference pointer.

10. The method of claim 9, wherein the caching comprises setting the region corresponding to the block to have a larger size than the block.

11. The method of claim 10, further comprising:
    after the caching, separating the region into a first region corresponding to the block and a second region not corresponding to the block; and
    transferring information on the first region to the main storage unit;
    wherein the main storage unit performs updating by using the information on the first region.

12. The method of claim 9, wherein the caching comprises, in a case of caching a plurality of blocks from the main storage unit, generating associativity among a plurality of frames by using position information of the frame.

13. The method of claim 9, further comprising:
    in a case of caching a second block after caching a first block, determining a region of a third block to be cached from the main storage unit by using position information between the first block and the second block; and
    caching the determined block from the main storage unit.

14. An apparatus for caching a frame, comprising:
    a storage module which receives information on a frame to be cached from a main storage unit; and
    a processing module which determines if the received information comprises information on a frame geometry or an address value including position information of the frame, which sets a mode from at least two modes based on the determining and which sets an initial value of the set mode using the received information based on the determining, and caching the frame from the main storage unit using the set mode wherein the at least two modes comprises a first mode in which a window with fixed block size is allocated for storing the frame using the received frame geometry and a second mode in which a window without a fixed block size is allocated for storing the frame using received address value.

15. The apparatus of claim 14, wherein the information on the frame geometry includes information on a block included in the frame geometry;

wherein the block has a size in an X-axis direction and a Y-axis direction based on a reference point, the X-axis direction is a horizontal axis direction, the Y-axis direction is a direction perpendicular to the X-axis direction, and the X-axis and the Y-axis form a plane.

16. The apparatus of claim 15, wherein the set mode includes a region;

wherein the region corresponding to the block includes at least one of negative coordinates of the X-axis direction and negative coordinates of the Y-axis direction based on the reference point; and wherein the region forms a region between the X-axis and the Y-axis.

17. The apparatus of claim 16, wherein the first mode includes a reference point corresponding to the reference point of the block that is included in information on the frame geometry, and a maximum value of X-axis direction coordinates and a maximum value of Y-axis direction coordinates.

18. The apparatus of claim 16, wherein the processing module sets a reference point of the first mode to move a distance in at least one of X-axis and Y-axis directions in the frame geometry, and caches the frame from the main storage unit by using the first mode corresponding to the moved reference point.

19. The apparatus of claim 16, wherein the processing module sets a reference point of a first mode to repeat movement for a distance in at least one of the X-axis and the Y-axis directions in the frame geometry to generate moved reference points, and caches the frame from the main storage unit by using the first mode corresponding to the respective moved reference points.

20. The apparatus of claim 16, wherein the processing module determining a region of a frame to be cached from the main storage unit, and caches the region of the determined frame from the main storage unit.

21. The apparatus of claim 16, wherein the second mode sets a reference pointer corresponding to the reference point of the block that is included in information on the frame geometry, and includes a maximum value of X-axis direction coordinates and a maximum value of Y-axis direction coordinates, based on the reference pointer.

22. The apparatus of claim 16, wherein in a case of caching a second block after caching a first block, the processing module determines a region of a third block to be cached from the main storage unit by using position information between the first block and the second block, and caches the determined block from the main storage unit.

23. The apparatus of claim 21, wherein in a case of caching a plurality of blocks, the processing module generates associativity among a plurality of frames by using position information of the frame.

24. The method of claim 1, wherein:

if the determining yields that the received information comprises information on the frame geometry, setting the mode to the first mode in which the frame is cached in the window with the fixed block size, and if the determining yields that the received information comprises an address value including position information of the frame, setting the mode to the second mode in which there is no allocation of a fixed block size and window size is variably determined and regions of the frame are stored in slots of cache and are associated with one another.

25. The apparatus of claim 14, wherein:

if the determining yields that the received information comprises information on frame geometry, the processing module sets the mode to the first mode in which the frame is cached in the window with the fixed block size, and if the determining yields that the received information comprises an address value including position information of the frame, the processing module sets the mode to the second mode in which there is no allocation of a fixed block size and window size is variably determined and regions of the frame are stored in slots of cache and are associated with one another.

26. The method of claim 24, wherein in the second mode, the frame comprises at least one of image frame or video frame.

27. The method of claim 24, further comprising providing a write mask such that in the second mode, data in adjacent region of the main storage unit is prevented from being destroyed even if blocks having non-uniform sizes are cached in the frame.

28. The method of claim 24, further comprising receiving a write mask set by a user such that in the second mode, data in adjacent region of the main storage unit is prevented from being destroyed even if blocks having non-uniform sizes are cached in the frame.

* * * * *